(12) United States Patent
Kozak et al.

(10) Patent No.: US 8,276,482 B2
(45) Date of Patent: *Oct. 2, 2012

(54) DAMAGED BOLT AND SCREW REMOVING DEVICES

(75) Inventors: Burton Kozak, Chicago, IL (US); Ira Kozak, Riverwoods, IL (US)

(73) Assignee: Combined Products Co. #1 Inc., Chicago, IL (US)

( * ) Notice: Subject to any disclaimer, the term of this patent is extended or adjusted under 35 U.S.C. 154(b) by 396 days.

This patent is subject to a terminal disclaimer.

(21) Appl. No.: 12/539,408

(22) Filed: Aug. 11, 2009

(65) Prior Publication Data

US 2010/0037734 A1 Feb. 18, 2010

Related U.S. Application Data

(63) Continuation-in-part of application No. 11/985,099, filed on Nov. 14, 2007, which is a continuation-in-part of application No. 11/255,424, filed on Oct. 22, 2005, now abandoned, which is a continuation-in-part of application No. 10/831,391, filed on Apr. 23, 2004, now Pat. No. 6,978,697.

(60) Provisional application No. 60/465,506, filed on Apr. 25, 2003.

(51) Int. Cl.
*B25B 13/50* (2006.01)
(52) U.S. Cl. .......................... 81/53.2; 81/441
(58) Field of Classification Search .................. 81/53.2, 81/441, 459, 460; 408/410, 411, 216, 217, 408/223–225, 227, 229, 230
See application file for complete search history.

(56) References Cited

U.S. PATENT DOCUMENTS

| | | | |
|---|---|---|---|
| 673,056 A | 4/1901 | Jacobs | |
| 1,105,535 A | 7/1914 | Roberts | |
| 1,129,049 A | 2/1915 | Smith | |
| 1,844,241 A * | 2/1932 | Bryant | 81/441 |
| 1,863,045 A | 6/1932 | Randall | |
| 1,863,046 A | 6/1932 | Githens | |
| 2,066,132 A | 12/1936 | Zihler | |
| 2,103,944 A | 12/1937 | Gullborg | |
| 2,480,648 A | 8/1949 | Harer | |
| 3,135,306 A | 6/1964 | Mangerian | |
| 3,161,090 A | 12/1964 | McLellan | |
| 3,392,767 A | 7/1968 | Stillwagon | |
| 3,517,714 A | 6/1970 | Desbarats | |
| 3,590,235 A | 6/1971 | Leo | |
| 3,604,488 A | 9/1971 | Wishart | |
| 3,678,789 A | 7/1972 | Wilson | |
| 3,739,825 A | 6/1973 | Knox | |

(Continued)

FOREIGN PATENT DOCUMENTS

WO  WO 01/66310  9/2001

(Continued)

*Primary Examiner* — Debra S Meislin
(74) *Attorney, Agent, or Firm* — Factor Intellectual Property Law Group

(57) ABSTRACT

A bit for removing a broken security fastener having an elongated shaft with a longitudinal axis. The shaft has a first end and a second end. The first end terminates in a tip region having a recess for receipt of the post of the security fastener, the recess being disposed substantially along the longitudinal axis. The second end of the shaft is configured to be received by the chuck of a tool which provides rotational torque.

17 Claims, 15 Drawing Sheets

U.S. PATENT DOCUMENTS

| | | | |
|---|---|---|---|
| 4,187,892 A * | 2/1980 | Simmons | 81/441 |
| 4,189,266 A | 2/1980 | Koslow | |
| 4,429,599 A | 2/1984 | La Sante | |
| 4,569,259 A | 2/1986 | Rubin | |
| 4,604,917 A | 8/1986 | Polonsky | |
| 4,682,917 A | 7/1987 | Williams | |
| 4,716,793 A | 1/1988 | Tauber | |
| 4,777,850 A | 10/1988 | Polonsky | |
| 4,800,787 A | 1/1989 | Cerny | |
| 5,031,487 A | 7/1991 | Polonsky | |
| D329,786 S | 9/1992 | Polonsky | |
| 5,160,232 A | 11/1992 | Maier | |
| D340,184 S | 10/1993 | Desaulniers | |
| 5,251,516 A | 10/1993 | Desaulniers | |
| 5,450,776 A | 9/1995 | Kozak | |
| 5,452,971 A | 9/1995 | Nevills | |
| 5,520,075 A | 5/1996 | Barmore | |
| 5,533,426 A | 7/1996 | Morales | |
| 5,551,320 A | 9/1996 | Horobec | |
| 5,827,019 A | 10/1998 | Morrissey | |
| 6,047,620 A | 4/2000 | Kozak | |
| 6,213,692 B1 | 4/2001 | Guehring et al. | |
| 6,431,801 B2 | 8/2002 | Vasudeva et al. | |
| 6,595,730 B2 * | 7/2003 | Bergamo | 408/227 |
| 6,742,416 B2 | 6/2004 | Bergamo | |
| 6,957,937 B2 | 10/2005 | Vasudeva | |
| 7,162,939 B2 * | 1/2007 | Totsu | 81/460 |
| 2002/0127071 A1 | 9/2002 | Vasudeva | |
| 2003/0136228 A1 | 7/2003 | Liu | |
| 2004/0134688 A1 | 7/2004 | Papousek | |
| 2006/0150780 A1 | 7/2006 | Chen | |
| 2006/0191379 A1 | 8/2006 | McCalley | |

FOREIGN PATENT DOCUMENTS

| | | |
|---|---|---|
| WO | WO 2004/002687 | 1/2004 |

* cited by examiner

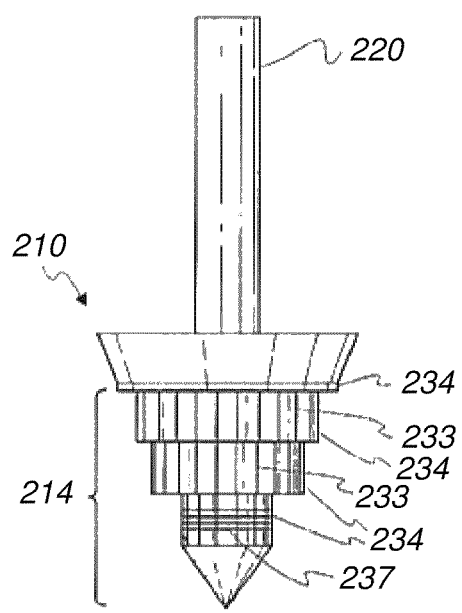
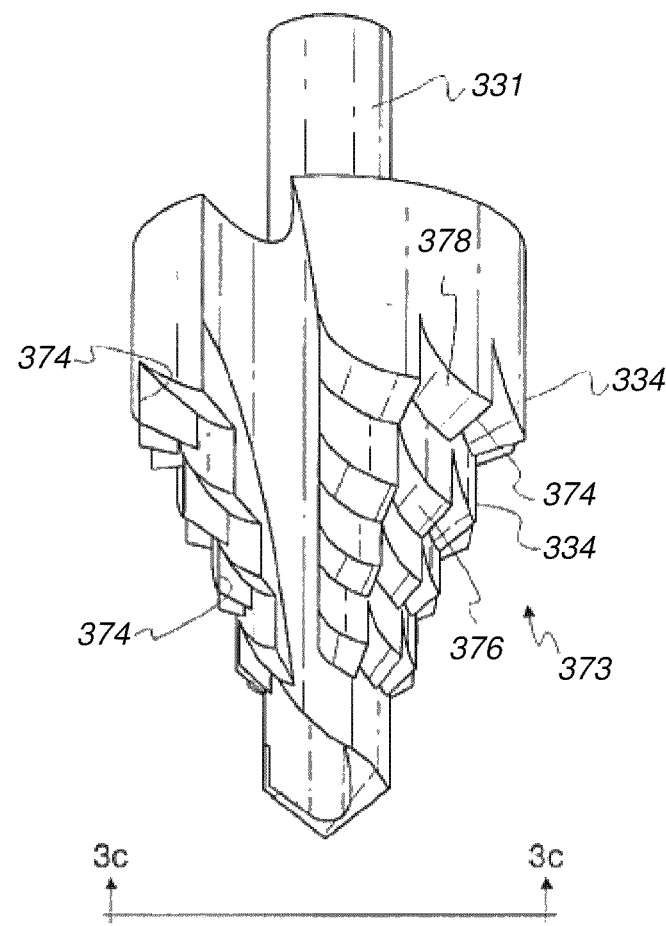
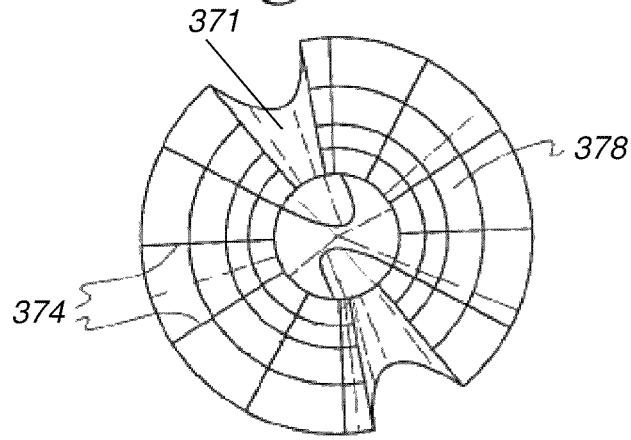

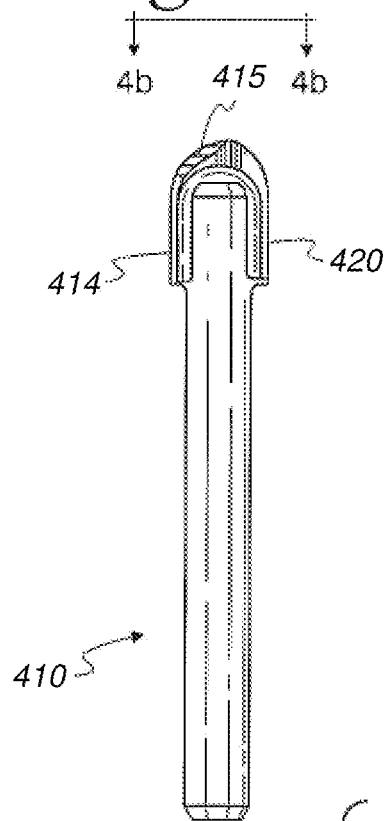
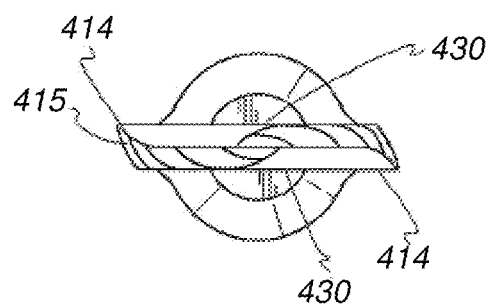
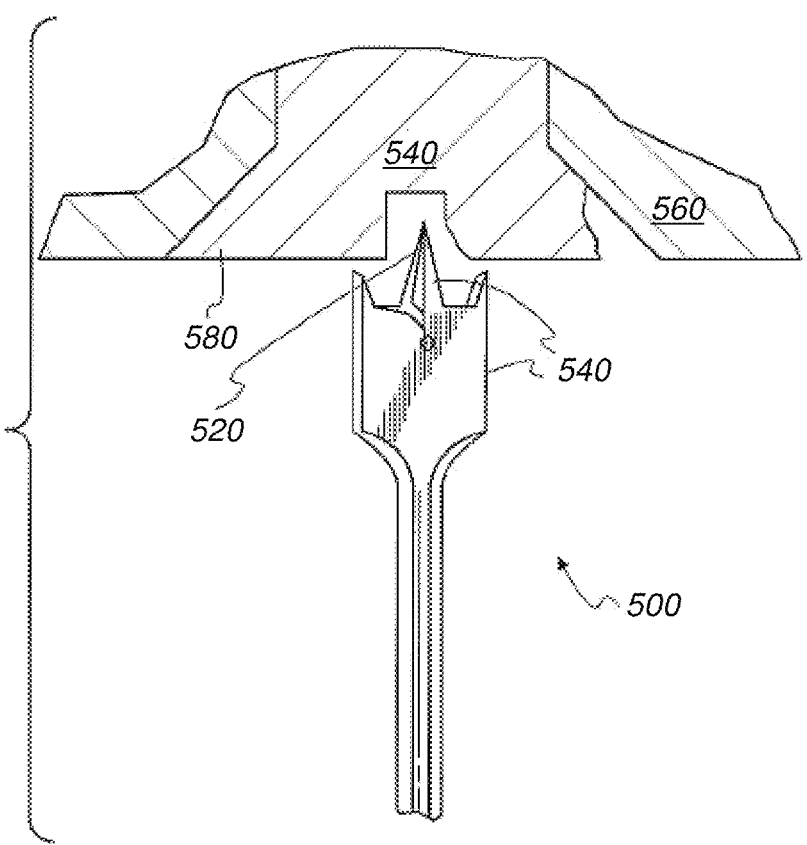

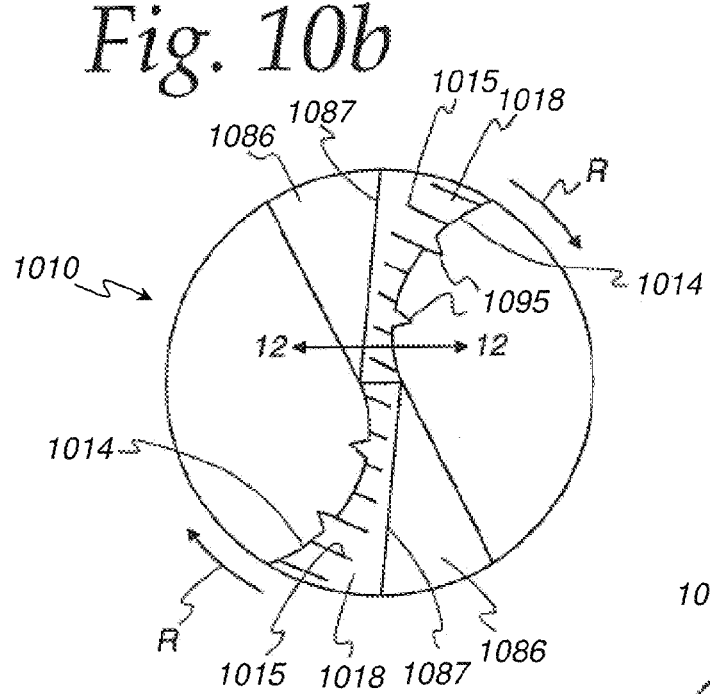
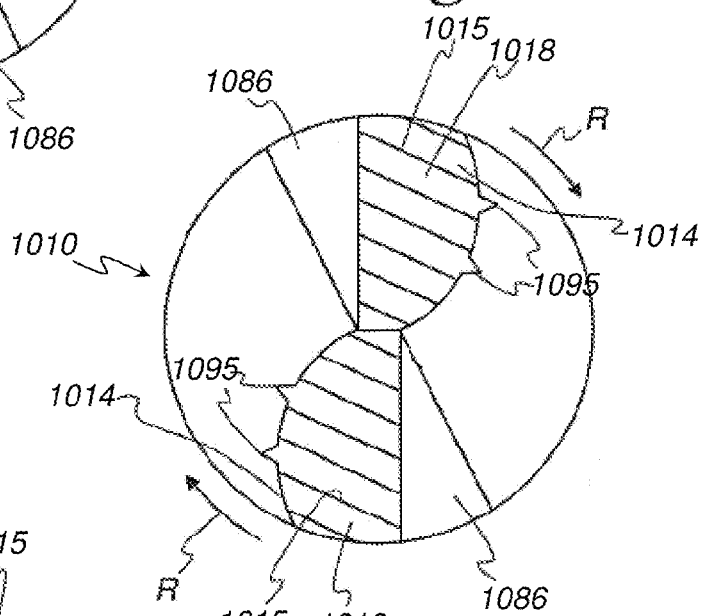
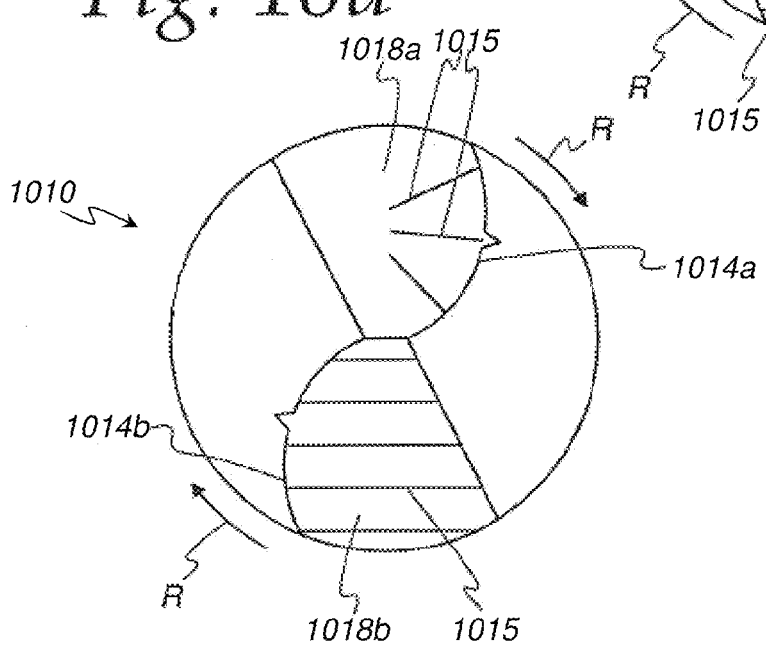

Fig. 15a
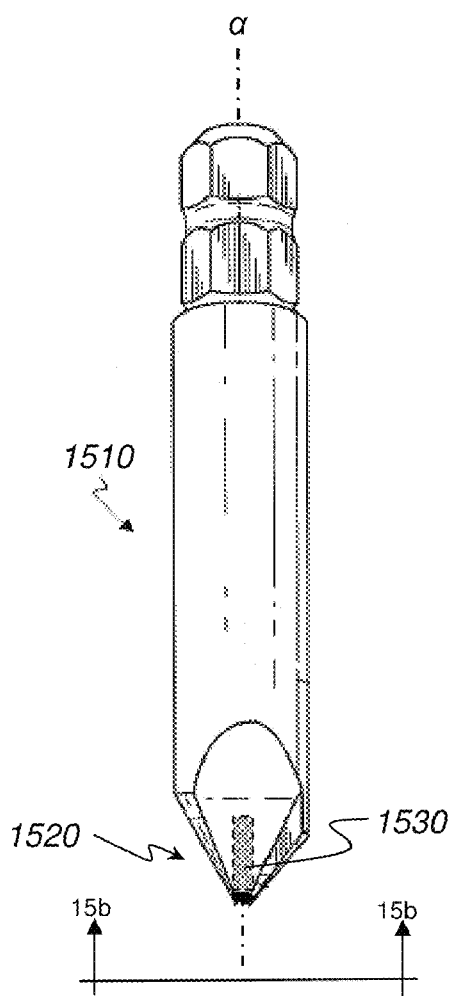
Fig. 15b
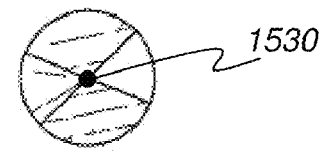
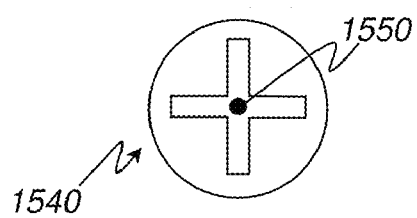

DAMAGED BOLT AND SCREW REMOVING DEVICES

RELATED APPLICATIONS

This patent application is a continuation-in-part of U.S. patent application Ser. No. 11/985,099 filed on Nov. 14, 2007, which in turn is a continuation-in-part of U.S. patent application Ser. No. 11/255,424 filed Oct. 22, 2005, now abandoned, which in turn is a continuation-in-part of U.S. patent application Ser. No. 10/831,391 filed Apr. 23, 2004 and issued as U.S. Pat. No. 6,978,697, which claims priority benefit to the filing date of U.S. Provisional Patent Application No. 60/465,506 filed on Apr. 25, 2003; the content of these applications is expressly incorporated herein by reference.

FIELD OF THE INVENTION

The present invention relates to the field of hardware tool bits, and more particularly, to a device for removing damaged fasteners still embedded in, or otherwise engaged with, a workpiece.

BACKGROUND OF THE INVENTION

The use of fasteners, such as screws, bolts, and other threaded joining devices, continues to increase. However, the more a fastener is used, the more likely that its head becomes rounded off, worn, broken, or otherwise rendered useless. At that point, the fastener must be extracted from the workpiece and replaced.

Screw removing bits known in the art generally utilize a tool shaft capable of rotation, such as manual and power-driven screwdrivers and drills. As such, one end of the bit is inserted into a rotating shaft tool, while the other end of the bit is configured to impart rotational torque to a fastener held fast in a workpiece.

Several broken bolt extractors feature a left-handed cutting edge. For example, U.S. Pat. No. 4,777,850 discloses two such edges. However, such devices still require considerable power to impart the rotational torque necessary to "bite" into the fastener and begin left-handed extraction.

U.S. Pat. No. 6,595,730 B2 awarded to Bergamo on Jul. 22, 2003, discloses a bit for removing damaged screws. This device is designed to engage the exterior surface of a fastener rather than the interior surface. As such, "purchase" of the fastener by the device is relegated to the exterior surface.

Another example of a prior art extraction device is the tool disclosed in German patent DE 19526631 A1. The tool depicts two cutting edges that drill a hole in a "frozen" screw, bolt, or rivet when rotated in a first direction, afterwhich the two cutting edges are able to loosen the fastener thereby providing a single tool that performs two functions and reduces extraction time. With such a tool, however, a recess must be present in the fastener to better facilitate its removal from the workpiece. Accordingly, the German tool cannot be used to remove a fastener having a slotted surface configuration unless the fastener includes a recess with a depth sufficient to allow the two cutting edges to be inserted therein. Otherwise, the slotted head fastener would be damaged during removal.

A need exists in the art for a broken bolt/screw extraction device which facilitates the easy removal of a fastener held tight by a workpiece. The device should be capable of being used with manual, hand-actuated tools and/or electrically activated (including battery operated) tools. The device should engage as much of the interior surface of a fastener as possible to decrease the likelihood of a spin off of the device from the fastener while concurrently increasing the likelihood of extraction of the fastener with minimal force.

SUMMARY OF THE INVENTION

Accordingly, the present invention is directed toward a bit for removing a broken fastener having a direction of engagement. The bit includes an elongated shaft having a longitudinal axis, a first end, and a second end. The first end terminates in a tip region, and has a plurality of nonlinear cutting edges extending radially therefrom. The cutting edges are configured to allow the bit to cut into a fastener when the bit is rotated in a direction opposite to the fastener's direction of engagement. The second end of the shaft is configured to be received by a tool which provides rotational torque.

In an embodiment of the present invention, the bit has a pair of generally radially projecting cutting edges. The cutting edges may be linear or curved. Each of the cutting edges define an angle with respect to the axis of the remover, and further define the periphery of a frusto-conical surface. Each of these surfaces forms an acute angle with respect to the axis of the bit.

An advantage of the invention is that the different cutting edge angles enhance the bite of the bit into the interior surfaces of the fastener. In one such embodiment, the cutting edges contain serrations which may be located substantially perpendicular to the longitudinal axis of the cutting edge to provide additional purchase of the fastener. The serrations allow the bit to effectively extract wayward fasteners at torque speeds as low as 0.25 RPM, and as high as typical RPM values of commercially available electric screw drivers and power tools. Hand-actuated screw drivers, by comparison, are typically turned one quarter turn per wrist roll such that 30 RPM is typical for a non-powered hand tool.

In yet another embodiment, the invention comprises a left-handed countersink drill bit containing serrations which extend from a cutting edge of the bit. This drilling feature of the remover provides that more interior surfaces of the fastener be made available to the cutting edges of the serrations, so as to allow the threaded cavity of the workpiece to remain intact as the fastener is removed.

In still another embodiment, a plurality of generally longitudinally-extending serrations are interposed between axially spaced steps in a drill bit. These serrations extend in a left-hand cutting fashion from a cutting edge of the bit. This embodiment can be utilized to extract fasteners having a myriad of different shank diameters.

In another embodiment, the tip region of the bit includes a recess disposed substantially along the longitudinal axis of the bit, which allows the bit to remove a security fastener having a post.

It is therefore an object of the present invention to provide a broken bolt/screw remover that overcomes many of the disadvantages of the prior art.

It is a further object of the present invention to provide a broken bolt/screw remover which requires only low levels of torque to extract a fastener.

Yet another object of the present invention is to provide a broken bolt/screw remover which also has a drilling function.

Still another object of the present invention is to provide a step drill with fastener remover capabilities.

An object of the present invention is also to provide a broken bolt/screw remover which can be used with security fasteners.

Other objects, advantages, and features of the present invention will become apparent from the following specification taken in conjunction with the accompanying drawings.

BRIEF DESCRIPTION OF THE DRAWINGS

The foregoing invention and its advantages may be readily appreciated from the following detailed description of the invention, when read in conjunction with the accompanying drawings in which:

FIG. 1ab is a top view of FIG. 1aa taken along the line 1ab-1ab;

FIG. 1ac is an elevational view of FIG. 1aa rotated 180 degrees around its longitudinal axis, in accordance with features of the present invention;

FIG. 1bb is a top view of FIG. 1ba taken along the line 1ba-1ba;

FIG. 1bc is an expanded view of the invented bit with serrated regions depicted in FIG. 1ba, in accordance with features of the present invention;

FIG. 1cb is a top view of FIG. 1ca taken along the line 1cb-1cb;

FIG. 1cc is an elevational view of an alternate embodiment of the invented bit with serrated regions, in accordance with features of the present invention;

FIG. 1cd is a top view of FIG. 1ca taken along the line 1cd-1cd;

FIG. 1db is a detailed view of an alternate configuration of the serrated regions depicted in FIG. 1ba, in accordance with features of the present invention;

FIG. 3a is a side view of a step drill bit with cutting threads, in accordance with features of the present invention;

FIG. 3b is a side view of an alternate step drill bit with serration portions, in accordance with features of the present invention;

FIG. 3c is a top view of FIG. 3b taken along the line 3c-3c;

FIG. 4a is a perspective view of an alternative fastener extraction device, in accordance with features of the present invention;

FIG. 4b is a top view of FIG. 4a taken along the line 4b-4b;

FIG. 5a is a modified spade flat, in accordance with features of the present invention;

FIG. 10b is a top view of an alternate embodiment of the invented bit taken along the line 1bb-1bb of FIG. 1ba, in accordance with features of the present invention;

FIG. 10c is a top view of an alternate embodiment of the invented bit taken along the line 1bb-1bb of FIG. 1ba, in accordance with features of the present invention;

FIG. 10d is a top view of an alternate embodiment of the invented bit taken along the line 1bb-1bb of FIG. 1ba, in accordance with features of the present invention;

FIG. 13b is a top view of an alternate embodiment of the invented bit taken along the line 13b-13b of FIG. 13a;

FIG. 15a is an alternate embodiment of the invented bit having a recess, in accordance with features of the present invention; and FIG. 15b is a top view of FIG. 15a taken along the line 15b-15b.

DETAILED DESCRIPTION OF THE INVENTION

Figure 1A:
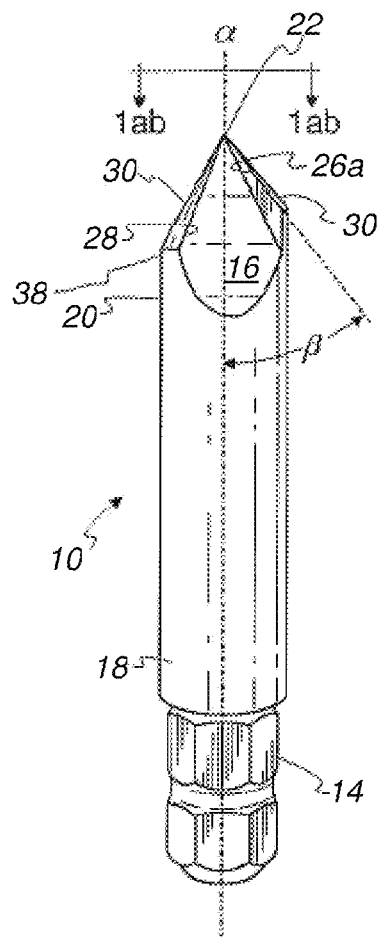
FIG. 1aa is an elevational view of the invented bit, in accordance with features of the present invention.
Figure 1A:
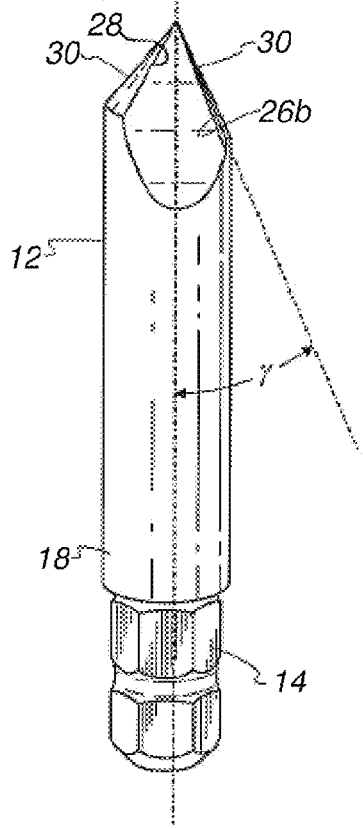

While this invention is susceptible to embodiments in many different forms, there are shown in the drawings and will herein be described in detail, preferred embodiments of the invention with the understanding that the present disclosures are to be considered as exemplifications of the principles of the invention and are not intended to limit the broad aspects of the invention to the embodiments illustrated.

FIG. 1aa provides salient features of the invented bit, the bit designated as numeral 10. The bit 10 generally comprises a shaft 12 having a periphery 18 and a first end 20 terminating in a tip region 22. While the tip region 22 is depicted as generally pointed, a non-pointed tip region may be utilized, such as a standard split-tip whose cutting surfaces are not coplanarly aligned with one another, or with the tip region. Being that the split-tip configuration minimizes and prevents "walk out" of the bit from the workpiece, it serves as a means for maintaining the bit on the fastener during rotational motion of the bit.

A second end 14 of the bit 10 is configured to be received by a tool which imparts rotational torque, including but not limited to a chuck, collet, or any other means for imparting torque which would be known to one skilled in the art. The cross section of the second end 14 can be circular, hexagonal, polygonal, or any other shape which would enable insertion of the bit 10 into a device which facilitates the tip region 22 being acted upon with rotational torque.

The bit 10 may further include one or more notches 16 which terminate on either side with a cutting edge 26 or non-cutting edge 28. These edges 26, 28 may be rectilinear or straight, as depicted in FIGS. 1*aa* and 1*ac*, or serrated, curved, or any combination thereof. The cutting edge 26 may face in a counterclockwise direction for extracting a fastener with a clockwise direction of engagement, or conversely face in a clockwise direction for extracting a fastener with a counterclockwise direction of engagement. In an embodiment containing two notches 16, the bit 10 will also contain two diametrically opposed frusto-conically shaped regions 30 located between, and bound by, cutting 26 and/or non-cutting 28 edges. These frusto-conical surfaces 30 intersect 38 with the bit periphery 18 so as to form an arc of a circle. A biting or traction-enhancing surface 32 may be included on at least a portion of the frusto-conical shaped region 30.

An angle is formed between the cutting edge and the axis α of the bit. In embodiments having more than one cutting edge, the angles formed with axis α may be the same for all or some of the cutting edges, or the angles may be different. As shown in FIG. 1*aa*, a first cutting edge 26*a* defines an angle β with respect to the axis α of the bit 10. FIG. 1*ac* shows the opposite side of the bit 10 wherein another cutting edge 26*b* defines an angle γ with longitudinal axis α of the bit.

Surprisingly and unexpectedly, the inventor has found that a difference in the cutting edge angles may facilitate greater bite into the shank of a broken fastener. The first angle β can differ from the second angle γ by as much as 50 percent, e.g. where the β is 45 degrees, and γ is 30 degrees. Preferably, the sum of the angles is such that any remaining slot of a broken fastener can simultaneously contact at least portions of each of the cutting edges.

Figure 1B:
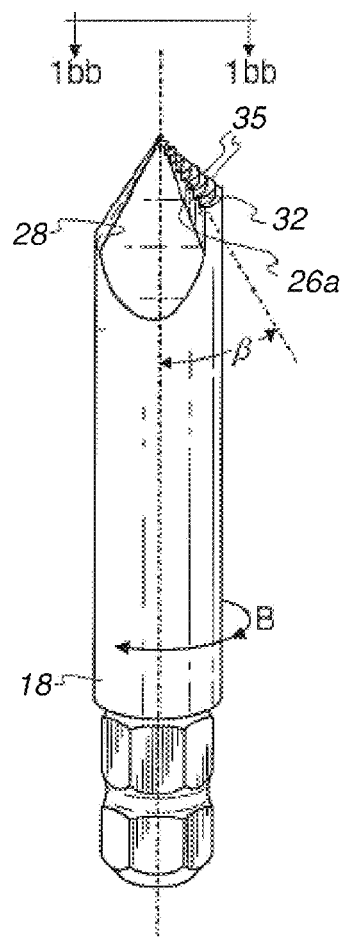
FIG. 1ba is an elevational view of the invented bit with serrated regions, in accordance with features of the present invention.
Figure 1A:
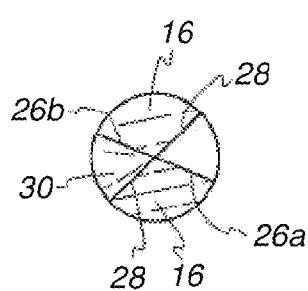
Figure 1B:
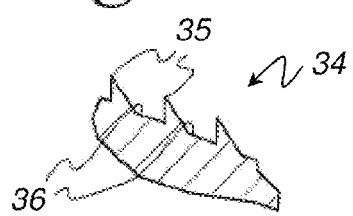
Figure 1B:
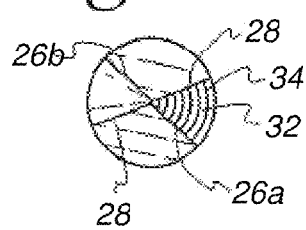

As shown in the embodiments of FIGS. 1*ba*, 1*bb*, and 1*bc*, serrations 34 are defined by alternating gaps 36 and ridges or "teeth" 35. These serrations 34 start along at least a substantial length of the cutting edge 26*a*, and extend transversely therefrom in a right-handed direction (i.e. opposite the direction of rotation of the bit in use). When the bit 10 is viewed from the top as in FIG. 1*bb*, it can be seen that the serrations 34 forming the biting surface 32 on the frusto-conical surface 30 are curved and run circumferentially parallel to the periphery 18 of the bit 10.

Figure 1C:
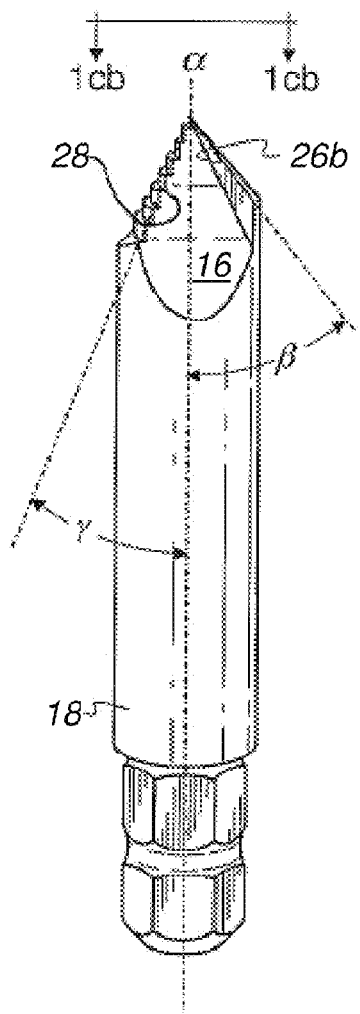
FIG. 1ca is an elevational view of an an alternate embodiment of the invented bit with serrated regions, in accordance with features of the present invention.
Figure 1C:
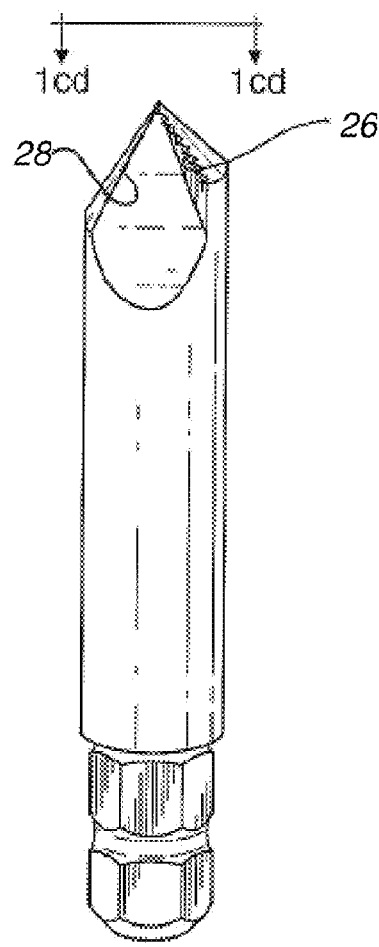
Figure 1C:
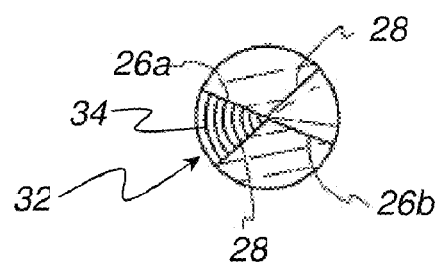
Figure 1C:
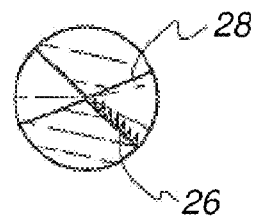

The invention provides that the serrations 34 can extend across the entire frusto-conical surface 30, so as to terminate on the non-cutting edge 28 as shown in FIGS. 1*ba*, 1*bb*, 1*ca*, and 1*cb*; may terminate at the region of the frusto-conical surface 30 intermediate the cutting edge 26 and non-cutting edge 28 as shown FIGS. 1*cc* and 1*cd*; or any combination thereof. Other exemplary, non-axially symmetric configurations are also shown in FIGS. 7*a*, 7*b*, 8, 9, 10*a*-10*f*, 13*a*, 13*b* and 14.

FIG. 1*ca* depicts the drill tip of FIG. 1*aa* with the addition of serrations 34 on the biting surface 32 of the frusto-conical surface region 30. The biting surface 32 is at an angle γ with respect to the axis α. In such an embodiment, the gap 36 between the teeth 35 may remain uniformly deep or decrease in depth as the serration 34 extends toward the non-cutting edge 28.

It should be appreciated that, inasmuch as the cutting edge 26 is radially displaced a greater distance from the bit's axis α then the non-cutting edge 28, the frusto-conical surface 30 situated intermediate the two edges define a radially-directed slope from the cutting edge 26 to the non-cutting edge 28.

The inventors have found that having one cutting edge serrated, and the next immediate cutting edge smooth enhances "bite" of the smooth cutting edge into the fastener, allowing easier extraction of the fastener from the workpiece. This alternating serrated/smooth cutting edge configuration provides a double action whereby the serrated edge roughens the topography of the fastener's surface, thereby serving as a means for enhancing purchase of the smooth cutting surface with the fastener.

In certain embodiments, a plurality of cutting edges on the same bit may be serrated with one configuration having edges biting into the fastener at different axial locations from each other. The serrated cutting edges may even be directly adjacent one another as opposed to having a smooth edge intermediate two serrated edges. A novel advantage of varying the angle of attack of the edges, e.g. the angles β and γ, is the minimization of the possibility that adjacent serrated edges will destroy the carcass of the fastener before the bit can anchor into the carcass.

Figure 1D:
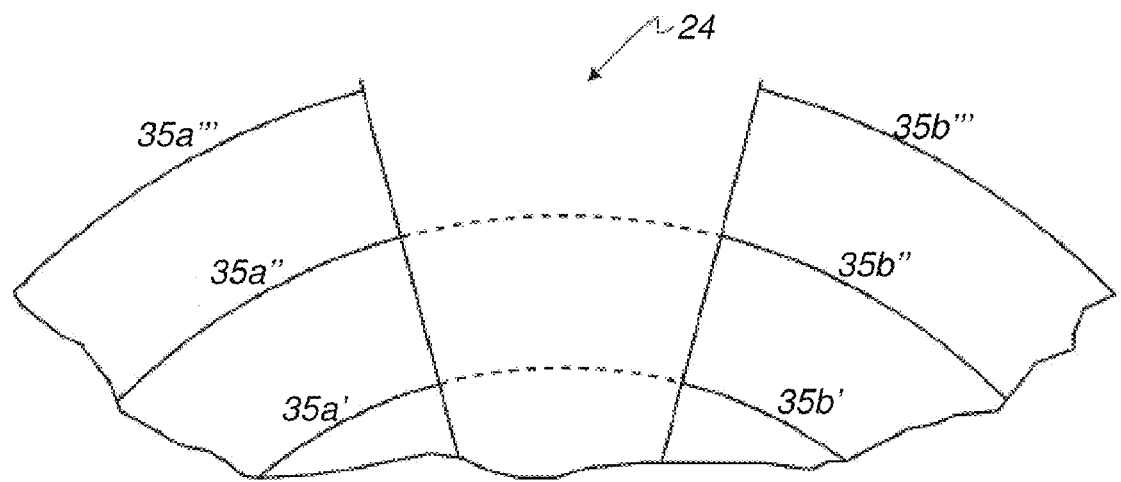
FIG. 1da is a detailed view of the serrated regions depicted in FIG. 1ba, in accordance with features of the present invention.
Figure 1D:
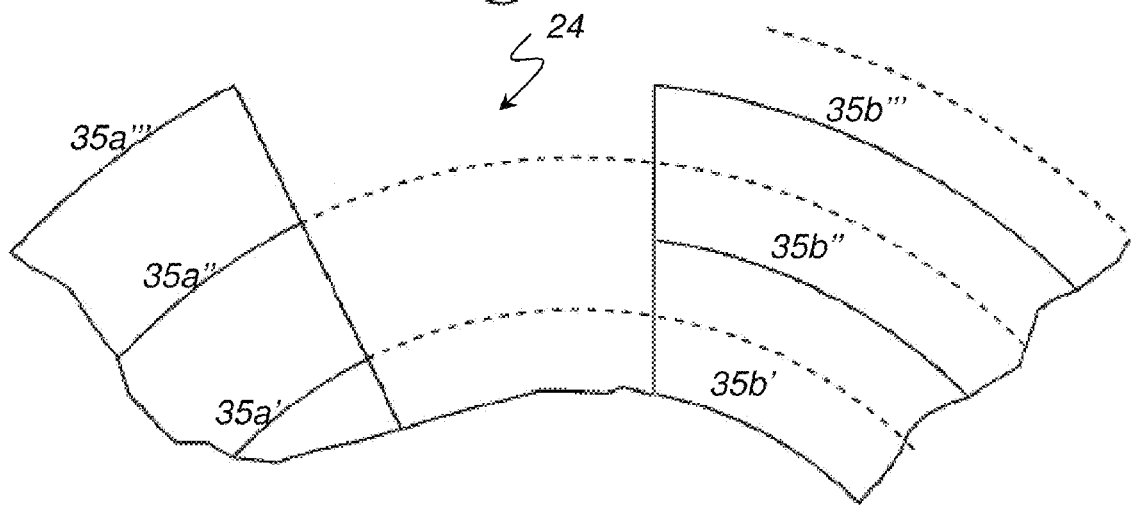

As has been discussed, there are many possible variations in the configuration of the serrations. For instance, the invention may provide for serrations on two cutting edges of the bit that are at the same angle with respect to the bit axis, whereby the serrations define two sets of teeth separated by gaps. In FIG. 1*da*, corresponding teeth on the two surfaces, e.g. 35*a*'-35*b*', 35*a*"-35*b*", etc., are azimuthally aligned across a notch 24 so as to be positioned the same radial distance from the longitudinal axis of the bit. FIG. 1*db*, however, has corresponding teeth 35*a* which are axially displaced with respect to the teeth 35*b* on the other side of the notch 24, but azimuthally aligned with the opposing gaps. This staggered serration configuration provides a means for allowing the serrations to bite at different radial and axial regions of the fastener.

Figure 2A:
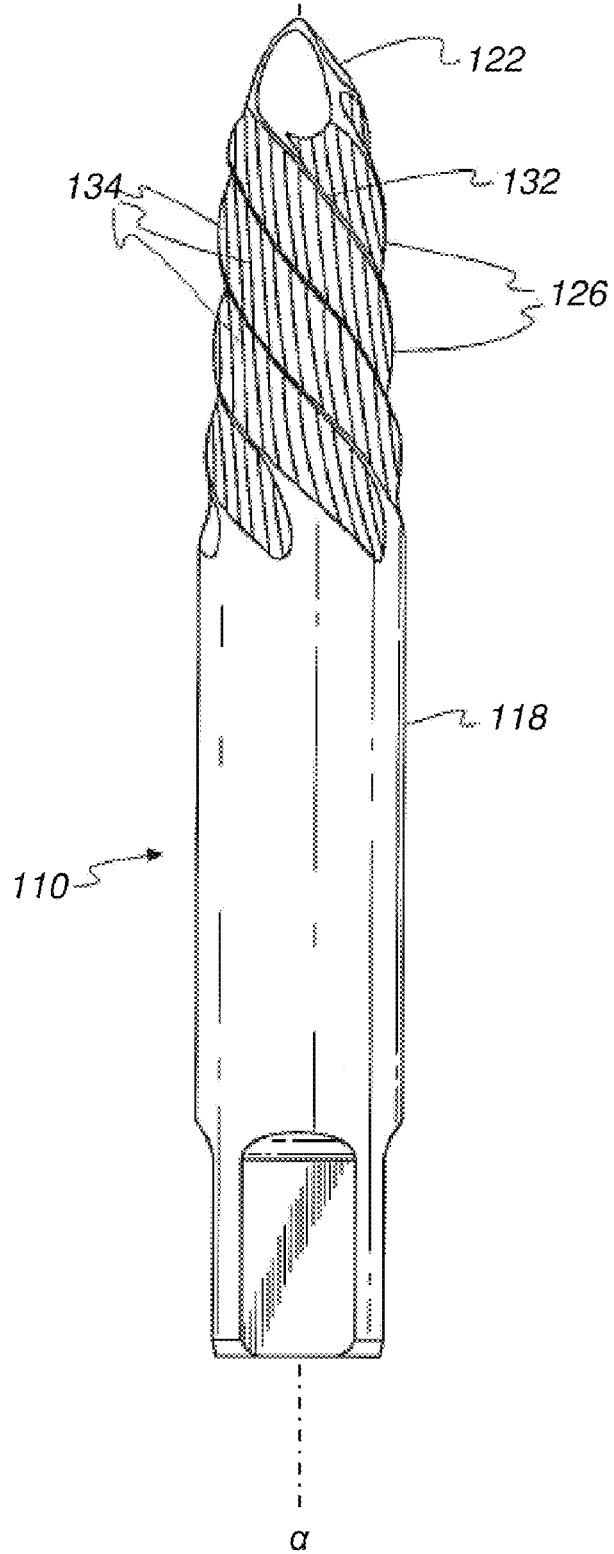
FIG. 2a is an elevational view of an easy out bit further defining a left-handed drill bit with serration portions, in accordance with features of the present invention.

In addition to bits which terminate at one end in a sharp apex, the bits may also terminate in a rounded or blunted apex, which is suitable for fasteners having particularly large diameter shanks, or for fasteners where a central cavity has been fashioned during a previous attempt to extract the fastener. For instance, FIG. 2*a* depicts an embodiment of the invented broken fastener remover, designated as numeral 110, which comprises a standard "easy out" configuration defined by a tapering, left-handed spiral. This embodiment comprises a plurality of left-handed spiral cutting surfaces 126 terminating in a drill bit 122 such as those disclosed in FIGS. 1*aa* and 1*ab*.

A fastener remover bit 110 having an easy out configuration may further include a plurality of serrations 134 extending from the cutting edges(s) 132 of the bit 110. These cutting edges 132 define helical regions which extend circumferentially along the periphery 118 of the bit 110 and are generally parallel to the longitudinal axis α. The serrations 134 may be located along one of more of the cutting edges 132 of the bit.

Figure 2B:
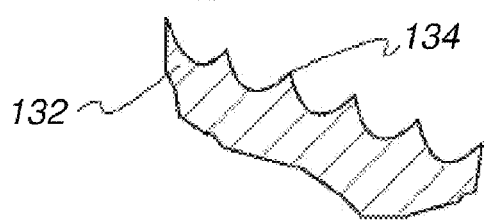
FIG. 2b is an expanded view of the cutting edge of FIG. 2a, in accordance with features of the present invention.

A salient feature of this embodiment is that the left-hand serrations 134 extend parallel to the longitudinal axis α of the bit 110 and bite into the recess of the screw head. FIG. 2*b* depicts a detail of a cutting edge 132 showing that the serrations 134 define teeth on the cutting edge 132 of the spiral cutting surface 126.

FIG. 3*a* depicts an alternate embodiment of a fastener removal bit designated as numeral 210. This removal bit 210 has a first end 220 adapted to be received by a rotating handle, chuck, or collet. A second end 214 of the removal bit 210 terminates in a bit configuration 239 similar to that depicted in FIGS. 1*aa*-1*ba*. Generally, the cutting region of the removal bit comprises a step drill configuration 234 and serrated edges 233 positioned intermediate the steps 234 of the configuration such that the serrations 233 extend radially from radially-facing surfaces of the steps 234. Also, these serration edges 233 generally extend parallel to the longitudinal axis of the bit 210, defining a left-handed (counterclockwise) cutting configuration.

In FIG. 3a, the steps 234 are axially spaced and otherwise arranged so that various fastener shank diameters can be accommodated with the removal bit 214. As such, the steps 234 have self-tapping screw threads 237 which are spaced apart to provide the anchoring necessary to withdraw the fastener in an axial direction once the bit 214 is buried into the fastener shank, while the threaded cavity in the workpiece is left intact.

FIGS. 3b and 3c depict an alternative step drill bit 373, wherein the steps 334 are configured to comprise counterclockwise cutting edges 374 and biting surfaces 378. More specifically, the bit 373 has a first end that terminates in a tip region 372 with two or more notches 371 extending longitudinally along the shaft 331 from the tip region 372. The notches 371 are separated by a plurality of cutting edges 379. The cutting edges 374 are arranged on biting surfaces 375 which are positioned along the axis and successively radially displaced further from the axis in a direction from the first end to the second end.

When the bit is rotated in a direction opposite to the fastener's direction of engagement, the cutting edges 379 are configured to cut into the fastener in progressive radial steps and cut azimuthally into the fastener. Depending regions of biting surfaces 375 comprise a plurality of teeth 376, each of the teeth defining one cutting edge 374 adapted to bite the fastener in a direction along the fastener's longitudinal axis. Thus, each of the steps 334 constitutes a hole saw that bites into the fastener as the drill bit 373 advances into the fastener.

The embodiment described in FIG. 3b contains features similarly described in the embodiments of FIGS. 1aa and 3a. Accordingly, the bit 373 may comprise serrated edges protruding from the biting surfaces 375 and self-tapping screw threads on one or more of the biting surfaces 375. Also, two or more cutting edges 379 may have dissimilar angles with respect to the axis.

FIG. 4a depicts a "glass drill" 410 in the shape of a solid rod having a carbide insert 420. The insert 420 resembles a flat "spade" and is positioned transversely to the longitudinal axis of the rod. As shown in FIG. 4b, the insert 420 consists of a 2-notch bit wherein each of the notches 430 is between 150 and 180 degrees. The distal end of the insert 420 defines a plurality of left-handed cutting edges 414, each of which may or may not be at the same angle relative to the longitudinal axis of the rod 410. Optionally, one or both of these edges 414 may define biting surfaces that contain serrations 415 extending transversely from the cutting edge 414. The cutting edges 414 are configured in a left-handed configuration, so that right-hand fasteners are extracted thereby. However, and as with all bits disclosed herein, the cutting edges 414 may be configured as right-hand facing so as to facilitate removal of left-handed fasteners.

In certain embodiments, the invented screw/bolt remover configuration may be integrally molded with other tool bits to optimize an already familiar tool. For example, FIG. 5a depicts a spade flat having elements of the invention depicted in FIGS. 1aa and 1ba. A typical spade drill comprises a shank adapted to be received in the chuck or collet of a torque-imparting tool, the shank terminating in a flat cutting element often called a "spade flat." The spade flat typically has cutting edges parallel to the shank, a cutting tip aligned with the shank, and/or side cutting tips parallel to the shank yet laterally displaced from the shank's axis.

Figure 5B:
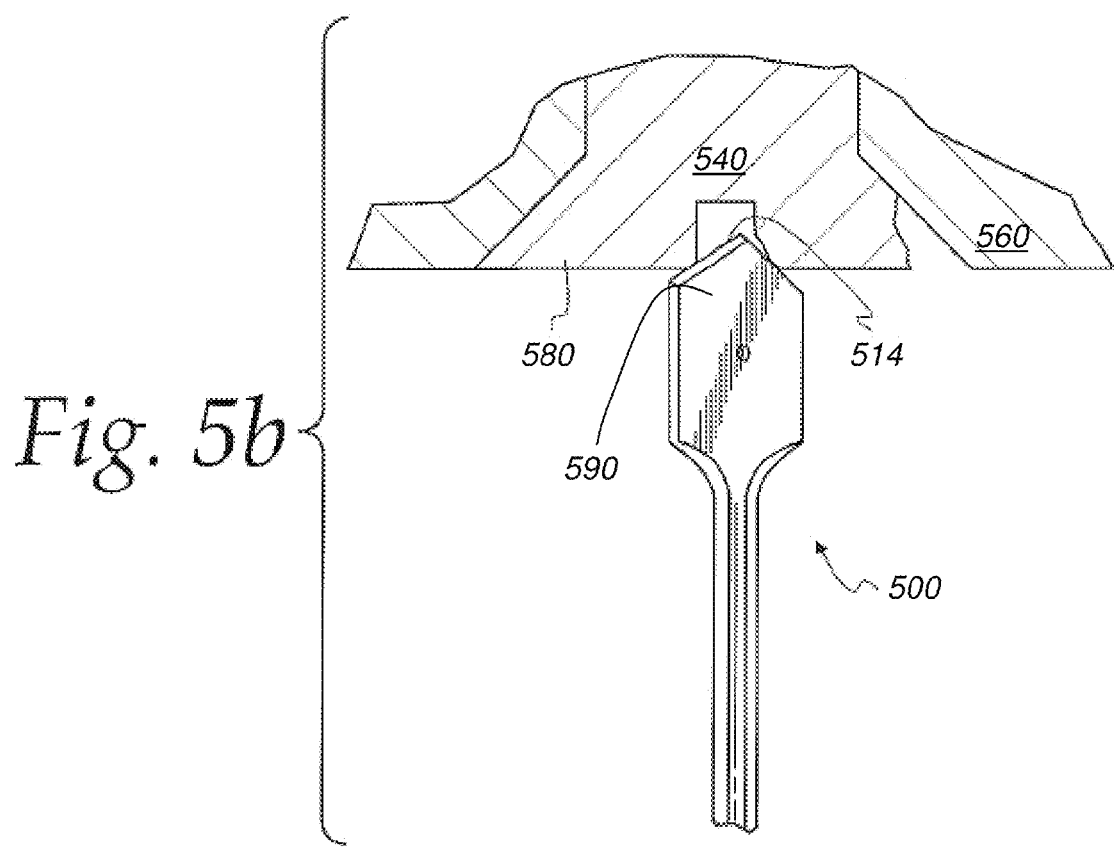
FIG. 5b is an alternate modified spade flat, in accordance with features of the present invention.

In FIGS. 5a and 5b, the spade flat hybrid 500 is depicted as positioned at the slot of a broken screw 540 which is countersunk into a workpiece 560. In FIG. 5a the invented hybrid bit 500 defines cutting edges 514 in a counterclockwise facing position of the spade flat 520, and on a tip 510 similar to those of FIGS. 1aa and 1ba. The bit 500 also comprises side cutting tips 530. In FIG. 5b, the spade flat 500 terminates in a triangular cutting element 590. In either embodiment, the cutting edges 514 of the spade flat hybrid 500 burrow into the head 580 of the screw 540 while in operation. The center of the slot of the screw 540 is shown as a pilot hole for the user of the hybrid bit 500.

As with previous embodiments, the spade flat may include a non-cutting edge and a biting surface having either a smooth or serrated topology. Moreover, while the spade flat is depicted as ¼" in size, this is for example only. A myriad of other spade flat sizes are suitable depending on the diameter of the residual fastener head or shank remaining.

Figure 6A:
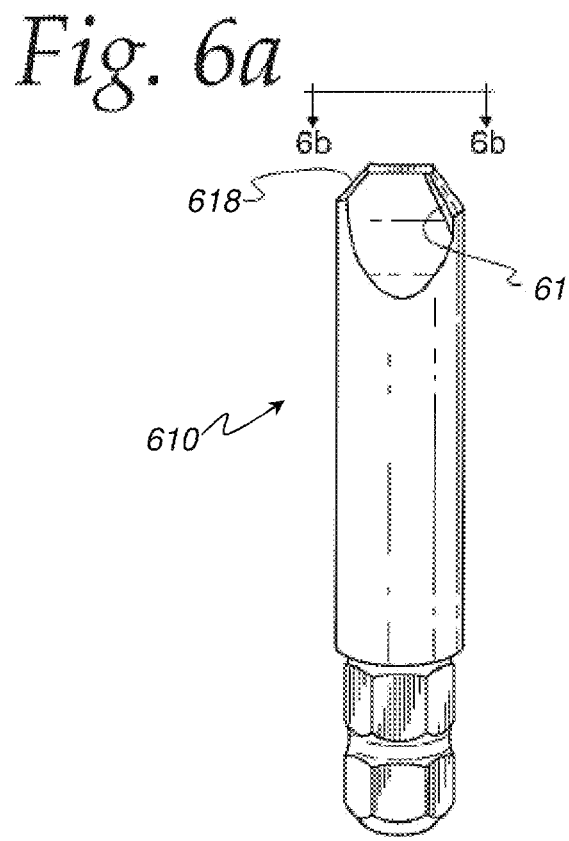
FIG. 6a is an elevational view of a modification of the invented bit, in accordance with features of the present invention.
Figure 6B:
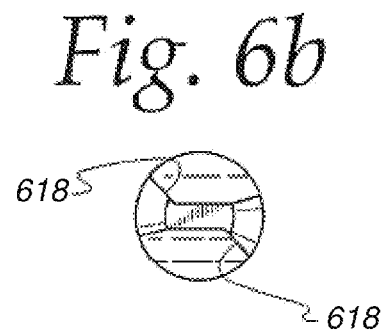
FIG. 6b is a top view of FIG. 6a taken along the line 6b-6b.

In the embodiments shown in FIGS. 6a and 6b, the bit 610 includes a blunted apex where the biting surfaces 618 are inclined at different angles with respect to the axis, similar to the bit of FIG. 1aa, and may also comprise serrations similar to those of FIG. 1ba.

Figure 7A:
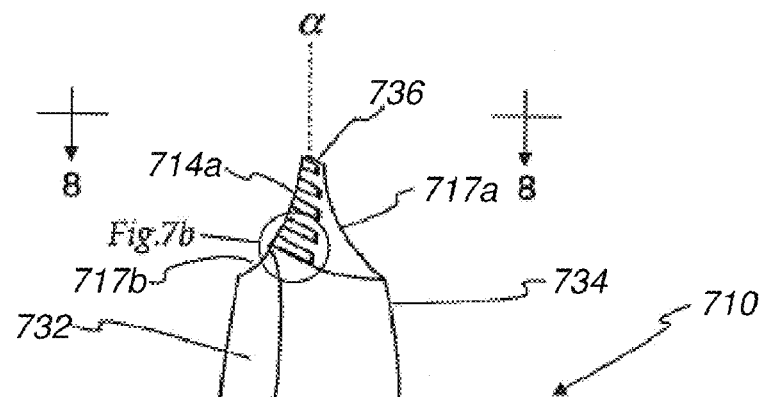
FIG. 7A is an elevation view of a extraction tool depicting non-linear cutting surfaces, in accordance with features of the present invention.
Figure 7B:
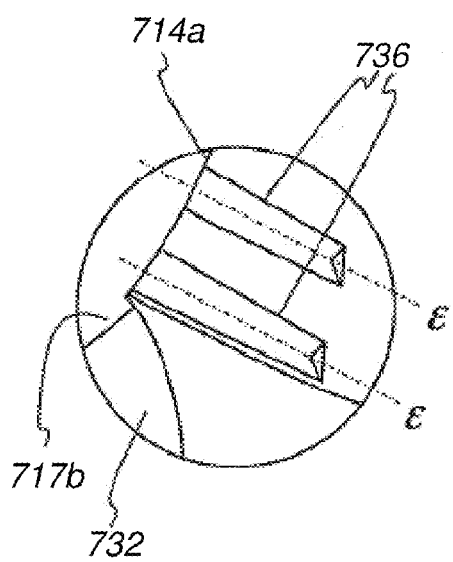
FIG. 7B is an exploded view of FIG. 7A showing details of cutting-edge serrations, in accordance with features of the present invention.

FIG. 7a depicts yet another embodiment wherein the non-cutting edge 717 forms a more acute angle with respect to axis $\alpha$ than the cutting edge 714, and wherein the cutting edges 714 are curved. Extending from the curved edges are two notches 732, 734.

Figure 8:
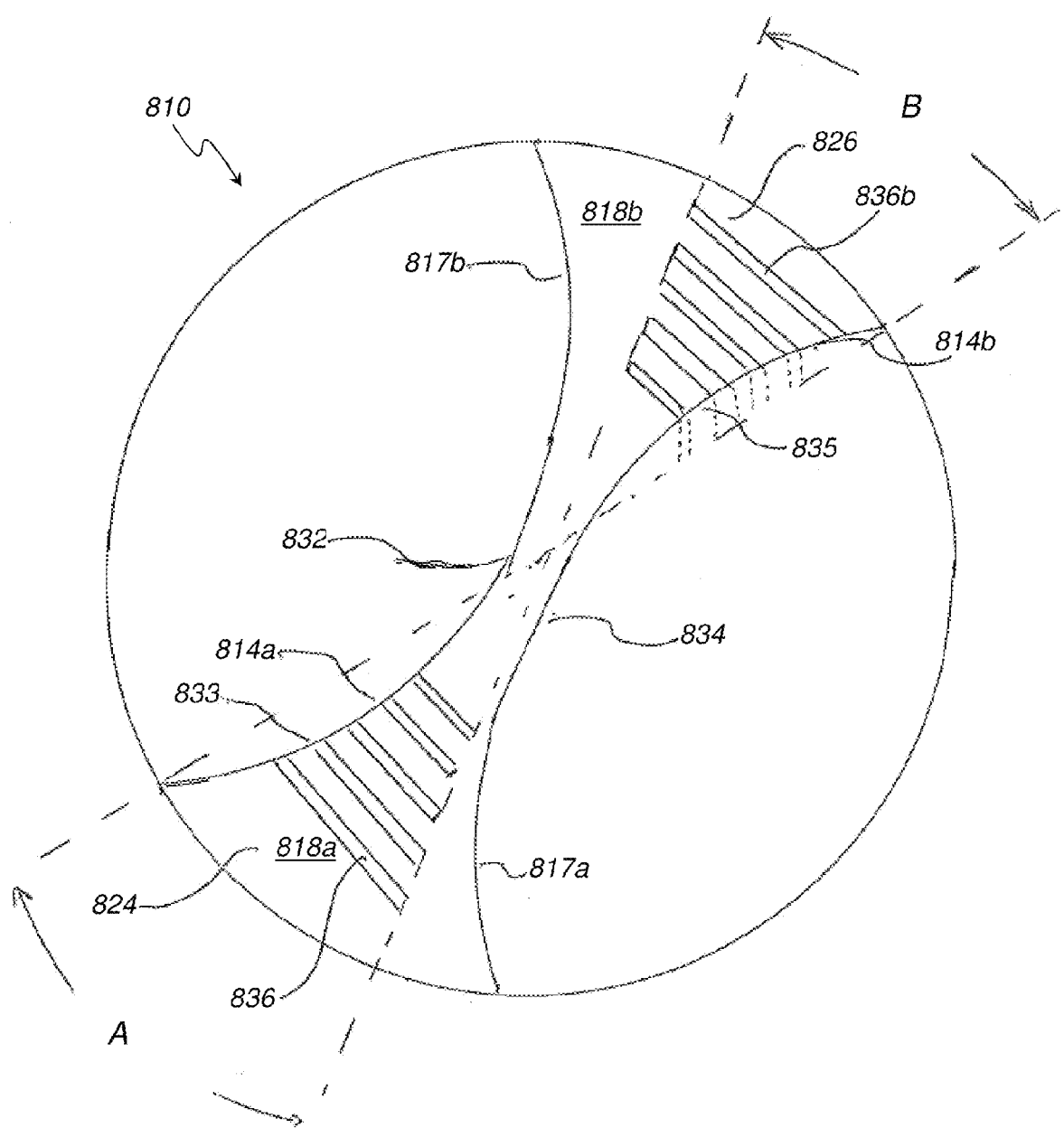
FIG. 8 is a view of FIG. 7A taken along line 8-8.

As shown in FIGS. 7a and 8, lineal serrations 736 extend in a direction generally orthogonal (i.e. along the direction $\epsilon$ in FIG. 7b) to a plane containing the longitudinal axis $\alpha$ of the bit 710. The serrations 736 define troughs or channels having triangular cross-sections which reside in planes parallel to the bit's longitudinal axis $\alpha$ (see detail in FIG. 7b).

An advantage of the configuration where the non-cutting edge is at a steeper angle than the cutting edge is that the tip region of the bit is made to wobble as it seeks to engage the broken fastener. This provides better bite of the bit into the fastener head since the bit engages the fastener head at different angles as it turns, and can find an angle where its engagement is maximal. This wobbling also induces vibrations in the fastener which facilitate its disengagement from the workplace.

The notches 732, 734 of FIG. 7a are shaped and reminiscent of the flutes or relief surfaces of left-hand drill bits. While the flutes of the illustrated embodiment extend generally along a straight line and parallel to the longitudinal axis of the bit, curved flutes are also suitable variants. Such flutes define an extended helix or spiral along a longitudinally extending section of the periphery of the bit and about its circumference. These curved flutes are further defined by serrations along their edges or rims which face in a direction the bit is to be rotated to extract fasteners, such as those of FIGS. 2a, 2b. Thus, for jobs requiring extraction of right-hand fasteners, the serrations would be found on flute edges which face in a counterclockwise direction.

Surprisingly and unexpectedly, the inventors have found that engagement between the removal device and the broken fastener is enhanced if the teeth on the traction surfaces are axially asymmetric. This can be accomplished through a variety of means. For example, in embodiments shown in FIGS. 8, 9, and 10a-10f, the serrations are straight and of different lengths, with the longer serrations radially displaced further from the bit's axis $\alpha$ than the shorter serrations; while the embodiment depicted in FIGS. 13a and 13b have serrations which are curved and parallel to each other but not circumferentially parallel to the bit periphery.

Referring to the top elevation view of the embodiment as shown in FIG. 8, nonlinear cutting edges 814a, 814b cooperate with the respective non-cutting edges 817a, 817b to form angles A and B which correspond to the radial arc of the notches 832, 834. In this embodiment angles A and B differ so as to define serrated traction surfaces 818a, 818b where one serrated traction surface 818a is wider than the other serrated traction surface 818b. This substantially congruent engagement results between the first and second extending notches 832, 834 of the fastener engagement end and the slot portions of the fastener to provide increased torque from the bit 810 to the fastener. However, other embodiments provide that traction surfaces 818a, 818b may be of the same width, and thus angles A and B are equal to one other.

Optionally, instead of, or in addition to the serrations 836 extending across the fastener engaging surfaces 824, 826, serrations are also provided which extend along interior wall portions 833, 835 of the notches 832, 834 which form the corresponding cutting edges 820, 822 (see dotted lines in FIG. 8). As with the serrations 836 extending across the fastener engaging surfaces 824, 826, the interior serrations may extend at least partially across the wall portions 833, 835 to both enhance engagement with a corresponding slot portion 818 of the fastener and maintain structural integrity of the bit 810.

Regarding any of the embodiments disclosed herein, where serrations are provided on the curved cutting edges, such as shown in FIGS. 7a, 7b, 8, 9, 10a-10f, 13a, 13b, and 14, the serrations may be lineal (i.e. straight or rectilinear), arcuate, segmented, radial (i.e. circular) or any combination thereof. Furthermore, such as in FIGS. 7a and 7b, when the serrations include a lineal configuration, the longitudinal axis ε of the serrations may have perpendicular, parallel, or inclined orientation with respect to the longitudinal axis α of the bit. An advantage of a linear serration configuration is that as the device is rotated, the serrations are continuously forced to engage or cut into new material in the fastener head.

Curved flutes and curved cutting edges are also shown in FIGS. 9, 10a-10f, 13a, 13b, and 14. The flutes define an extended helix or spiral along a longitudinally extending section of the periphery of the bit and about its circumference. These curved flutes are further defined by serrations along their edges or rims. The edges face in the direction the bit is to be rotated to extract the fastener.

Figure 9:
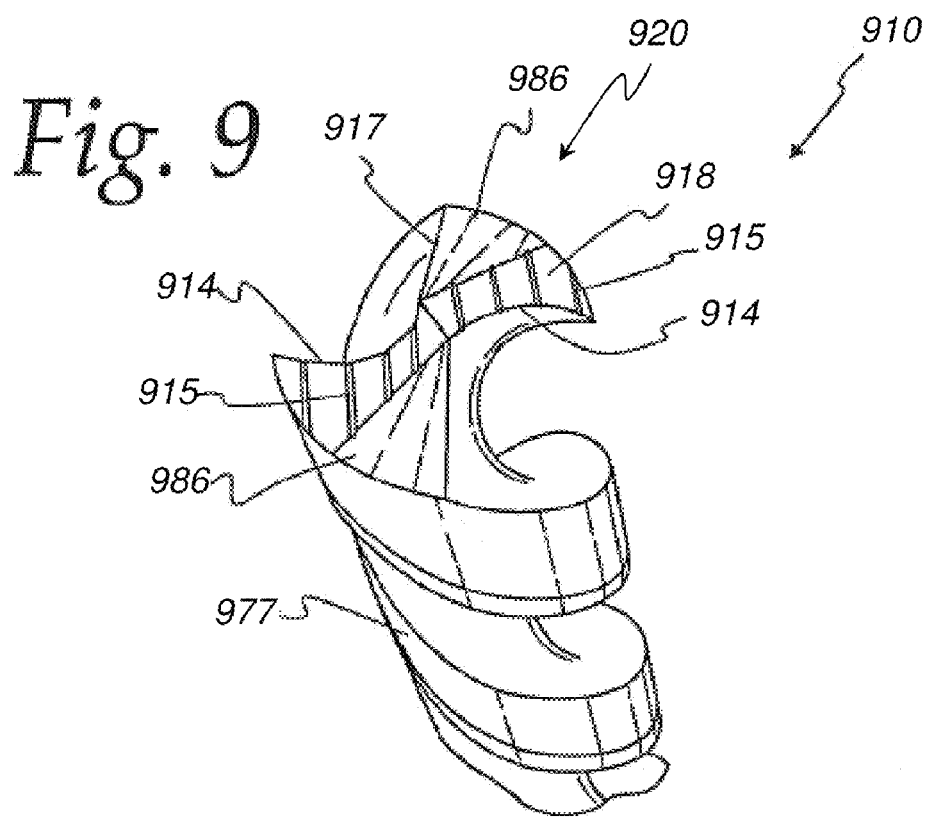
FIG. 9 is a perspective view of a left-hand drill terminating with a fastener extraction device, in accordance with features of the present invention.

In FIG. 9, for example, the fastener remover constitutes the tip region 920 of a left-handed drill 977 which combines non-linear cutting edges 914, non-cutting edges 917, rectilinear teeth 915, and a multi-tiered traction surface with a relief surface 986. The tip region 920 also features a multi-tiered traction surface comprising the frusto-conical surface 918 adjacent to the cutting edge 914 abutting a relief surface 986. The relief surface 986 defines a steeper angle with respect to the axis of the bit 910 compared to the frusto-conical surface 918.

The fastener extractor features of the tip region of a drill bit, such as depicted in FIG. 9, may comprise any or several combinations of cutting edges, traction surfaces, serrations, and teeth as disclosed herein. An advantage of the extractor tip/drill bit combination is that it allows simultaneous boring into the fastener and application of an extracting torque. The extracting torque is more effective as the tip penetrates deeper into the fastener. Moreover, the vibrations produced by the boring facilitate easier disengagement and extraction of the fastener thread from the workpiece.

Figure 10A:
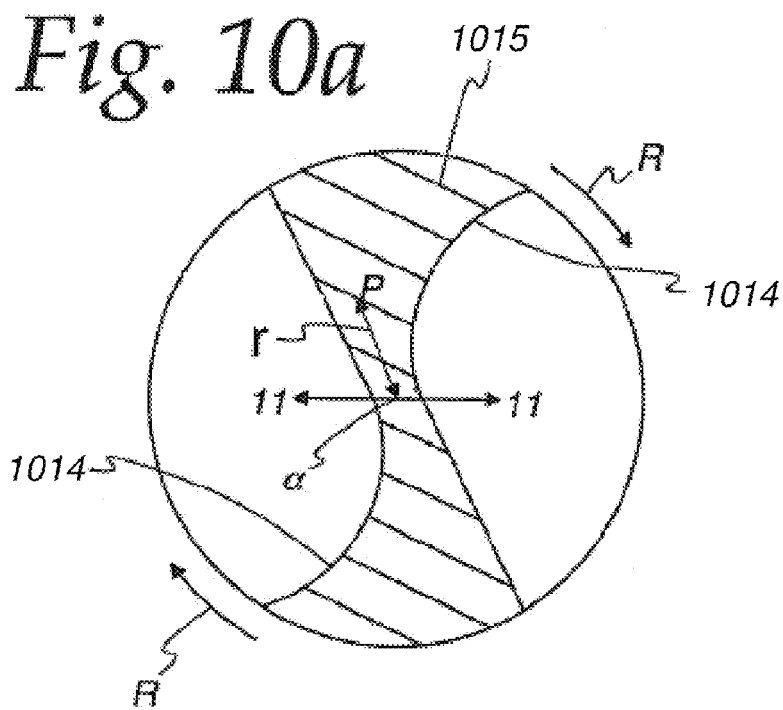
FIG. 10a is a top view of an alternate embodiment of the invented bit taken along the line 1bb-1bb of FIG. 1ba, in accordance with features of the present invention.

FIG. 10a depicts lineal serrations with the teeth 1015 lying on planes orthogonal to the longitudinal axis α of the bit 1010, but oriented so that the radial distance r between the longitudinal axis α of the bit 1010 and a point P on a tooth 1015 increases as the shortest distance between P and the cutting edge 1014 increases. The cutting edge 1014 in FIG. 10a is also curved, presenting a concave cutting edge facing in the direction R in which the device is rotated. Although the teeth 1015 in FIG. 10a are depicted as being parallel, this need not be the case.

Figure 12:
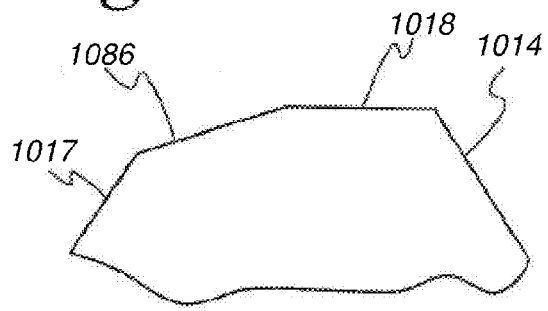
FIG. 12 is a cross-sectional view of FIG. 10b along the line 12-12.

FIG. 10b depicts lineal serrations with teeth 1015, each of which is orthogonal to the curved cutting edge 1014 of the bit 1010. FIG. 10b also features a multi-tiered traction surface comprising a frusto-conical surface 1018 adjacent to the cutting edge 1014 abutting a relief surface 1086. The relief surface 1086 defines a steeper angle with respect to the axis of the bit 1010 compared to the frusto-conical surface 1018, as depicted in detail in FIG. 12. The teeth 1015 in FIG. 10b extend only over a fraction of the distance between the cutting edge 1014 and the line 1087 marking the demarcation between the regions 1018, 1086. The two-tiered traction surface in FIG. 10b provides the aforementioned benefits with respect wobbling, such as discussed in connection with FIG. 7a.

FIGS. 10c and 10d depict embodiments which feature a convex curved cutting edge 1014 together with pointed protuberances 1095, configured as spikes, extending parallel to the axis of the bit 1010. The protuberances 1095 point in a direction perpendicular to the axis of the bit 1010. In addition, serrations with teeth 1015 extend along planes perpendicular to the axis of the bit 1010.

In FIG. 10c, the configuration of the teeth 1015 is the same as in FIG. 10a, and the configuration of the traction surfaces 1018 and relief surfaces 1086 are the same as in FIG. 10b. In FIG. 10d, however, the teeth defining serrations 1015 on the traction surfaces 1018a are orthogonal to the cutting edge 1014a while the teeth 1015 on the surface 1018b are orthogonal to a plane parallel to the axis of the bit 1010.

Figure 10E:
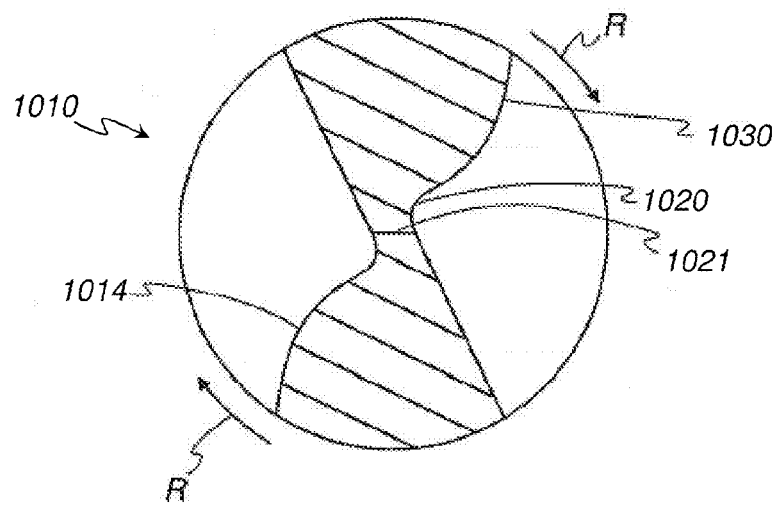
FIG. 10e is a top view of an alternate embodiment of the invented bit taken along the line 1bb-1bb of FIG. 1ba, in accordance with features of the present invention.
Figure 10F:
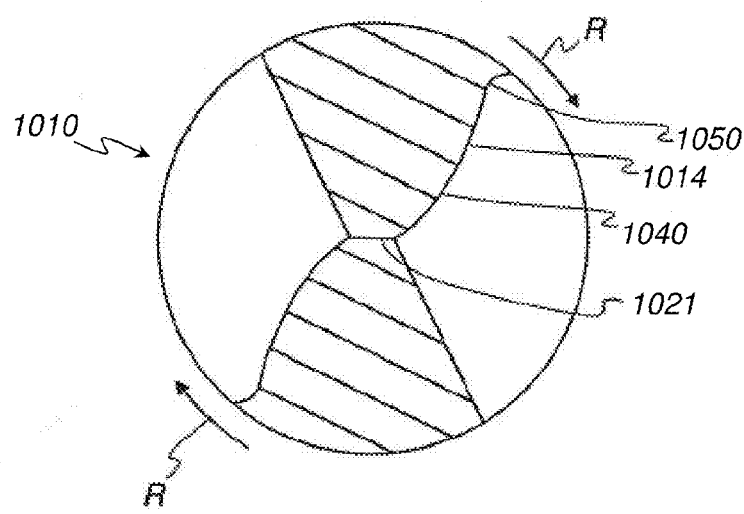
FIG. 10f is a top view of an alternate embodiment of the invented bit taken along the line 1bb-1bb of FIG. 1ba, in accordance with features of the present invention.
Figure 11:
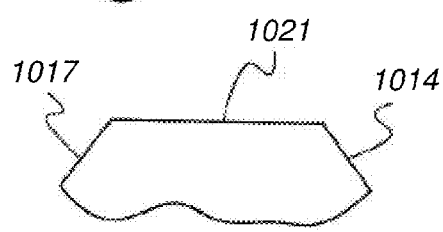
FIG. 11 is a cross-sectional view of FIG. 10a along the line 11-11.

FIGS. 10e and 10f depict additional embodiments of the curved cutting edges of the presently invented bit 1010. In FIG. 10e, the curved cutting edge 1014 has a concave section 1020 in a region proximal to the tip region 1021 of the bit 1010, and a convex region 1030 in a region distal and radially displaced from the tip region 1021. FIG. 10f has a convex section 1040 in a region proximal to the tip region 1021 of the bit 1010, and concave region 1050 in a region distal from the tip region 1021, such that the concave region 1050 extends to, and intersects with, the periphery of the bit 1010.

Figure 13A:
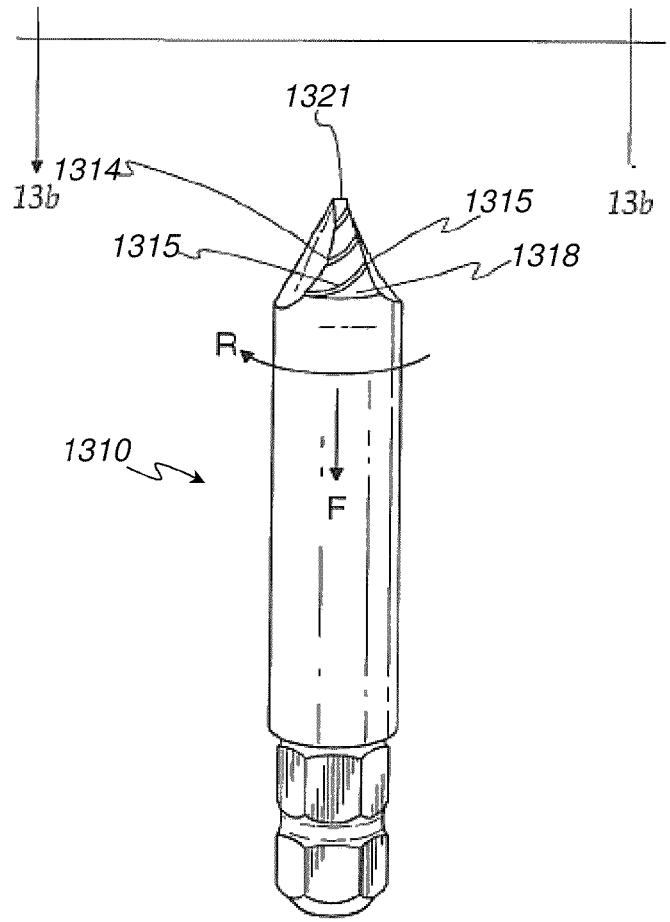
FIG. 13a is a side view of an alternate embodiment of the invented bit in accordance with features of the present invention.
Figure 13B:
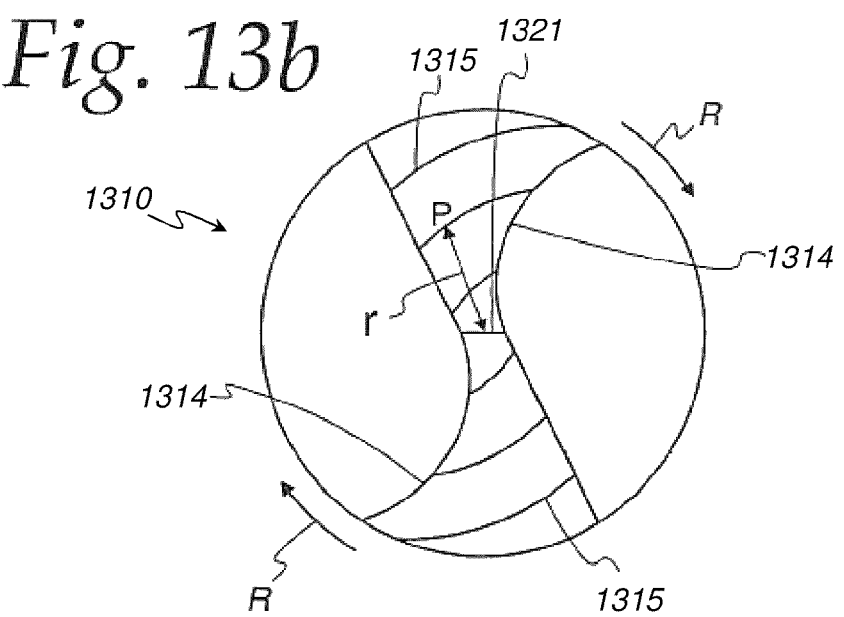
Figure 14:
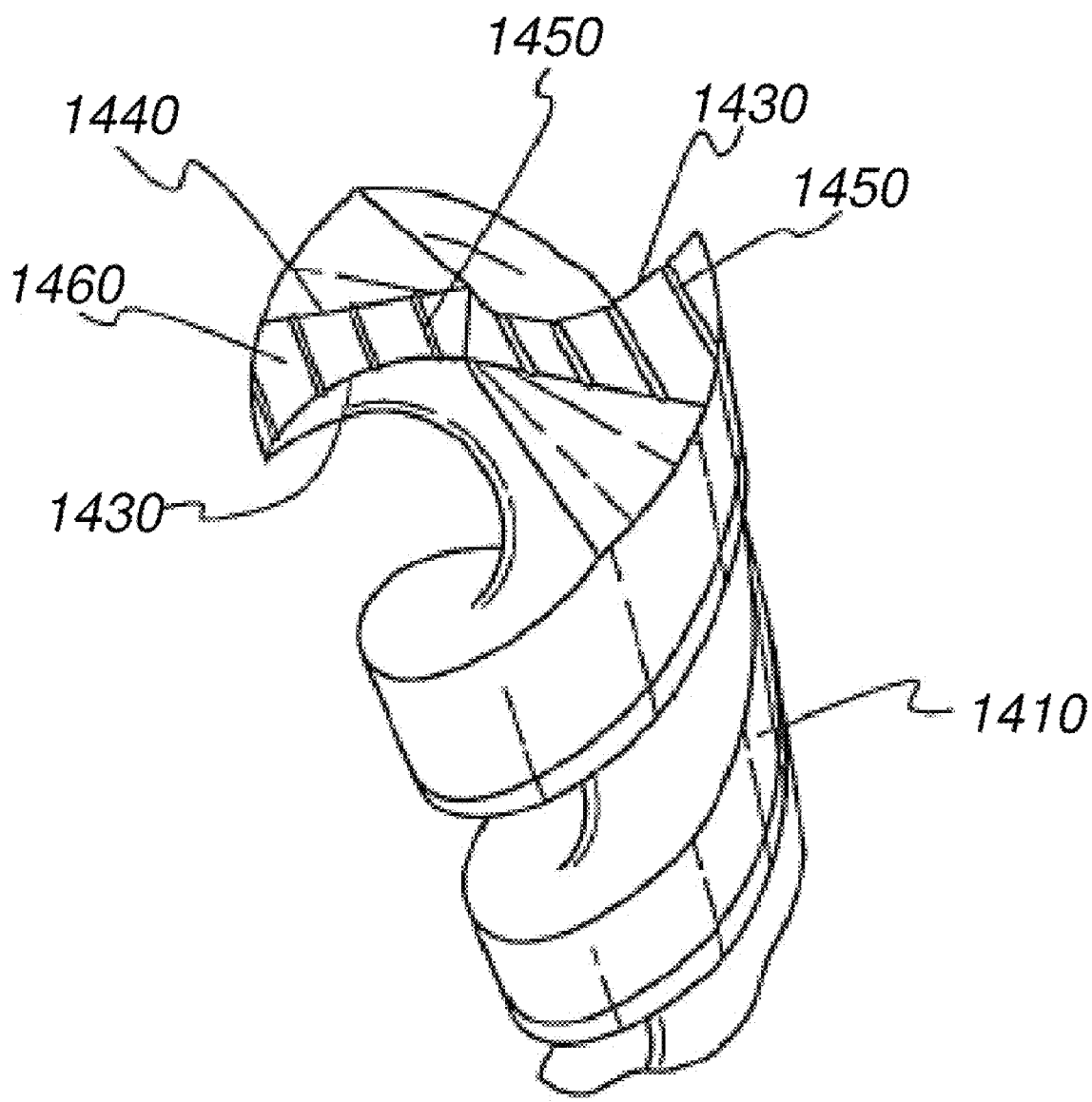
FIG. 14 is a perspective view of a right-hand drill terminating with a fastener extraction device, in accordance with the features of the present invention.

FIGS. 13a and 13b present a side and top view, respectively, of an alternate embodiment of the teeth 1315 on the traction surfaces 1318 of the bit 1310. The teeth 1315 on the traction surface 1318 in the present embodiment define spiral sections such that the distance r from the tip region 1321 of a point p on a tooth 1315 decreases as the distance between p and the cutting edge 1314 increases. Preferably, the pitch of the spiral defined by the teeth 1315 should be the same as that of the screw-thread of the fastener being extracted.

As shown in the embodiment of FIG. 13a, rotation in the direction R of the bit 1310 into the fastener to be extracted produces a force F on the fastener. This force F is in the direction in which the fastener is intended to move. In some cases, it may be desirable to have configurations where the teeth 1315 on the traction surface 1318 define spiral sections such that the distance r from the tip region 1321 of a point p on a tooth 1315 increases as the distance r between p and the cutting edge 1314 increases.

The features depicted in the embodiment shown in FIG. 9 can also be incorporated into a right-handed drill bit. For example, in FIG. 14 the tip region 1420 of a right-handed drill bit 1410 constitutes an extractor for left-handed fasteners.

The fastener remover tip region 1420 combines rectilinear teeth 1450, as featured in FIG. 10*a*, and a multi-tiered traction surface 1460 with a relief surface as featured in FIG. 10*b*. The fastener-extracting device includes non-linear cutting edges 1430, non-cutting edges 1440, and rectilinear teeth 1450 on the traction surfaces 1460. However, the fastener extractor features of the tip region of a bit may comprise any or several combinations of cutting edges, traction surfaces, serrations, and teeth as disclosed herein.

Fasteners known as security fasteners have a post located generally at the center of the security fastener head or face, while those fasteners without a security post may be referred to as having a "normal face." The security post prevents removal of the security fastener with a typical screwdriver or tool, and must be removed with a tool having a recess or other post-receiving means.

While the general term "post" is used throughout the present disclosure to describe the security means employed in a security fastener, it should be understood that that the security means is not limited to a post, and includes any means or device known in the art which provides added security with respect to the ability to insert or remove a fastener, and may therefore require a specially designed fastener, fastener tool, or both. Moreover, should a post such as the kind described herein be employed in a security fastener, it should not be limited in shape to a "post" or "pin," but may be of any size and/or shape which would provide added security to the fastener. Exemplary shapes known in the art include circle, square, triangle, hex, and star shapes.

With respect to removing a broken, damaged, or otherwise affixed security fastener, a recess is present in the tip region of one embodiment of an extractor bit, the recess allowing the security post of the security fastener to be received therein. Accordingly, FIGS. 15*a* and 15*b* disclose a bit 1510 similar to that of FIGS. 1*aa* and 1*ab* respectively, with the additional feature that the tip region 1520 includes a recess 1530 disposed substantially along the longitudinal axis α. This recess 1530 receives the post 1550 of the security fastener 1540, such as triangle, hex, square, Torx, spline, and Phillips security fasteners, allowing for easier extraction of the security fastener 1540. The recess 1530 may be of varying size, shape, circumference, length, width, depth and the like, so as to accommodate any size, shape and type of security fastener post 1550. While an exemplary embodiment is shown in the bit of FIGS. 15*a* and 15*b*, it should be understood that a recess may be employed in any of the various embodiments of fastener extractors disclosed herein.

Any of the aforementioned invented bits may be configured to include a means for preventing the bits from dislodging from broken fasteners once engagement with said fasteners occurs. In this regard, "finders" may be installed, which are accessories associated with, and coaxial to, the shanks of the bits and in slidable communication therewith. Generally configured as cylinders, sleeves, chucks or collets, the finders are adapted to slide over the periphery of a fastener which is held fast in a work piece. As such, the finders maintain the bit in a position coaxial to the longitudinal axis of the fastener to assure adequate embedding of the bit into the fastener. The finder also prevents jumping or skipping of the bit from the fastener to adjacent surfaces of the workpiece, thus preventing marring or scuffing of said workpiece.

Another addition to the invented device is the positioning of a collar or radial projection about the circumference of the device. The collar or projection would be positioned intermediate the first and second end of the device and serve as a means for preventing penetration of the device into the fastener beyond the distance defined by the tip region of the device and the position of the collar.

While in the foregoing there has been set forth a preferred embodiment of the invention, it is to be understood that the present invention may be embodied in other specific forms without departing from the spirit or central characteristics thereof. The present embodiments, therefore, are to be considered in all respects as illustrative and not restrictive, and the invention is not to be limited to the details given herein. While specific embodiments have been illustrated and described, numerous modifications come to mind without significantly departing from the characteristics of the invention and the scope of protection is only limited by the scope of the accompanying Claims.

We claim:

1. A bit for removing a fastener having a security post and a direction of engagement, the bit comprising:
   an elongated shaft with a longitudinal axis, the shaft having a first end, and a second end, the first end terminating in a tip region having a recess disposed substantially along the longitudinal axis;
   a plurality of cutting edges extending radially from the tip region, the cutting edges configured to cut into the fastener when the bit is rotated in a direction opposite to the fastener's direction of engagement,
   a plurality of non-cutting edges extending from the tip region, wherein the cutting edges and non-cutting edges alternate with one another, and
   a plurality of frusto-conical traction surfaces each extending from one cutting edge to a non-cutting edge,
   wherein the cutting edges and non-cutting edges alternate with one another,
   wherein each cutting edge defines an angle to the longitudinal axis of the bit, and
   wherein the second end of the shaft is configured to be received by a chuck of a tool which provides rotational torque.

2. The bit according to claim 1 the recess being sized so as to accept at least a portion of the security post.

3. The bit according to claim 1 wherein the shape of the recess is selected from the group consisting of circle, square, triangle, hexagon, pentagon, star, linear, curvilinear and non-linear shapes.

4. The bit according to claim 1 wherein the recess is configured to receive the post of a fastener, the fastener selected from the group consisting of security triangle, security Torx, security hex, security socket, security spline, security square, and security phillips fasteners.

5. The bit according to claim 1 wherein the angles of at least two cutting edges are dissimilar.

6. The bit according to claim 1 wherein one or more of said cutting edges define scraping surfaces.

7. The bit according to claim 6 wherein the scraping surfaces comprise serrations.

8. The bit according to claim 7 wherein each serration defines a crest and a gap and the crests of the serrations on a first cutting edge are aligned with the gaps of corresponding serrations on a second cutting edge, and wherein the crests and the gaps lie at the same radial distance from the longitudinal axis.

9. The bit according to claim 7 wherein a first scraping surface and a second scraping surface have identical angles with respect to the longitudinal axis.

10. The bit according to claim 9 wherein the first and the second scraping surfaces comprise serrations.

11. The bit according to claim 10 wherein the serrations on the first surface are aligned with corresponding serrations on the second surface, and wherein the corresponding serrations lie at the same radial distance from the longitudinal axis.

12. The bit according to claim 10 wherein each serration defines a crest and a gap.

13. The bit according to claim 12 wherein the crest of the serrations on the first surface are aligned with the gaps of corresponding serrations on the second surface, and wherein the corresponding crests and gaps lie at the same radial distance from the longitudinal axis.

14. The bit according to claim 10 wherein the serrations on the first surface are aligned with corresponding serrations on the second surface, and wherein the corresponding serrations lie at the same radial distance from the longitudinal axis.

15. A bit according to claim 1 wherein the cutting edges are curved.

16. The bit according to claim 1 wherein one or more of the frusto-conical traction surfaces includes a plurality of serrations.

17. The bit according to claim 16 wherein the plurality of serrations are axially asymmetric.

* * * * *